United States Patent
Daiber et al.

(12) 
(10) Patent No.: US 6,288,804 B1
(45) Date of Patent: Sep. 11, 2001

(54) POSITIVE UNIT MAGNIFICATION REFLECTIVE OPTICS FOR HOLOGRAPHIC STORAGE

(75) Inventors: Andrew J. Daiber, Palo Alto; Mark E. McDonald, Mountain View, both of CA (US)

(73) Assignee: Siros Technologies, Inc., San Jose, CA (US)

(*) Notice: Subject to any disclaimer, the term of this patent is extended or adjusted under 35 U.S.C. 154(b) by 0 days.

(21) Appl. No.: 09/640,906

(22) Filed: Aug. 16, 2000

Related U.S. Application Data

(63) Continuation of application No. 09/071,478, filed on May 1, 1998, now Pat. No. 6,147,782.

(51) Int. Cl.$^7$ .................................................. G02B 5/32
(52) U.S. Cl. .............................. 359/15; 359/1; 359/19; 359/22; 359/24; 369/275.1; 430/1
(58) Field of Search ............................ 359/1, 15, 19–22, 359/24, 25; 369/275.1; 430/1

(56) References Cited

U.S. PATENT DOCUMENTS

| | | | |
|---|---|---|---|
| 3,618,049 | 11/1971 | Amodei et al. | 340/173 |
| 3,720,921 | 3/1973 | Schools et al. | 340/173 |
| 3,947,640 | 3/1976 | Ruell et al. | 179/100.3 B |
| 4,024,513 | 5/1977 | Huignard et al. | 340/173 |
| 4,045,115 | 8/1977 | Lee | 350/3.5 |
| 4,138,189 | 2/1979 | Huignard et al. | 350/3.64 |
| 4,183,094 | 1/1980 | Keezer et al. | 365/127 |
| 4,458,345 | 7/1984 | Bjorklund et al. | 369/103 |
| 4,920,220 | 4/1990 | Phaff | 544/90 |
| 5,202,875 | 4/1993 | Rosen et al. | 369/94 |
| 5,243,589 | 9/1993 | Stuke et al. | 369/100 |
| 5,283,777 | 2/1994 | Tanno et al. | 369/108 |
| 5,289,407 | 2/1994 | Strickler et al. | 365/106 |
| 5,422,873 | 6/1995 | Kewitsch et al. | 369/103 |

(List continued on next page.)

FOREIGN PATENT DOCUMENTS

| | | | |
|---|---|---|---|
| 4208328 | 3/1992 | (DE) | G11B/7/00 |
| 19534501 | 9/1995 | (DE) | G11B/7/007 |

OTHER PUBLICATIONS

Glezer et al., Three–dimensional optical storage inside transparent, Op. Soc. of Am., vol. 21, No. 24, 1996.

Homan, S., High capacity optical storage using multiple wavelengths, multiple layers and volume holograms, Elec. Letters, 31(8), pp. 621–623, 1995.

Eichler, H., High density disc storage by multiplexed microholograms, SPIE, vol. 3109, pp. 239–244, 1997.

(List continued on next page.)

*Primary Examiner*—Cassandra Spyrou
*Assistant Examiner*—Craig Curtis
(74) *Attorney, Agent, or Firm*—Lumen Intellectual Property Services

(57) ABSTRACT

A positive unit magnification reflective head is used to back-reflect a primary light beam, for storing reflection microholograms at the coincident foci of the primary and reflected beams. Imaging the primary beam focus onto itself at positive unit magnification allows increasing system tolerance to tilts and transverse misalignments between the primary and reflective heads. Holograms are stored at multiple depths in a holographic storage medium. Tunable-focus primary and reflective heads are positioned on opposite sides of the storage medium. The reflective head images each storage location onto itself at positive unit magnification. Suitable reflective heads include: two lenses in an f-2f-f configuration and a planar mirror; a lens and a corner cube; a thin lens and a thick lens with a coated reflective back surface; and a thin lens and a back-coated gradient-index (GRIN) lens. To control the polarization of the reflected beam, the corner cube may include a plastic filler bonded on the back of the reflective surface. The filler index of refraction is chosen such that the primary beam is incident on the reflective surface of the corner cube at the critical angle.

4 Claims, 3 Drawing Sheets

U.S. PATENT DOCUMENTS

| | | | |
|---|---|---|---|
| 5,440,669 | 8/1995 | Rakuljik et al. | 359/7 |
| 5,450,218 | 9/1995 | Heanue et al. | 359/21 |
| 5,479,394 | 12/1995 | Yashima et al. | 369/275.1 |
| 5,636,190 | 6/1997 | Choi | 369/44.23 |
| 5,659,536 * | 8/1997 | Maillot et al. | 369/275.1 |
| 5,759,721 | 6/1998 | Dhal et al. | 430/1 |
| 5,761,111 | 6/1998 | Glezer | 365/106 |
| 5,786,117 | 7/1998 | Hoshi et al. | 430/21 |

OTHER PUBLICATIONS

Diez, S., High density disc storage by multiplexed microholograms, Optical Institute of Tech. Univ. of Berlin, Strasse des 17, Juni 135, 10623 Berlin Germany, CLEO 1997, pp. 258–259.

Fleisher, H. et al., An optically assessed memory using the lippmann process for information storage, Op. Elec. Info Proc., Chap. 1, pp. 11–40, MIT Press 1965.

Parthenopoulos, D. et al., Three–dimensional optical storage memory, Science, vol. 245, pp. 843–845, 1989.

Kawata, Y. et al., Three–dimensional optical memory with a photorefractive crystal, Appl. Opt. (34) 20, pp. 4105–4110, 1995.

Kawata, Y. et al., Randomly accessible multilayers optical memory with a Bi12SiO20 crystal Appl. Opt., (35) 26, pp. 5308–5311, 1996.

Eichler, H. et al., Multiplexed holograms for the microholographic storage disc, Conference Proceedings for Optical Data Storage '98, pp. 77–79, May 10, 1998. (copy of the article is enclosed).

Eichler, H. et al., Holographic recording of microscopic Bragg–reflectors for optical data storage, Conference Proceedings for Optical Data Storage '98, pp. 159–161, May 10, 1998. (copy of the article is enclosed).

* cited by examiner

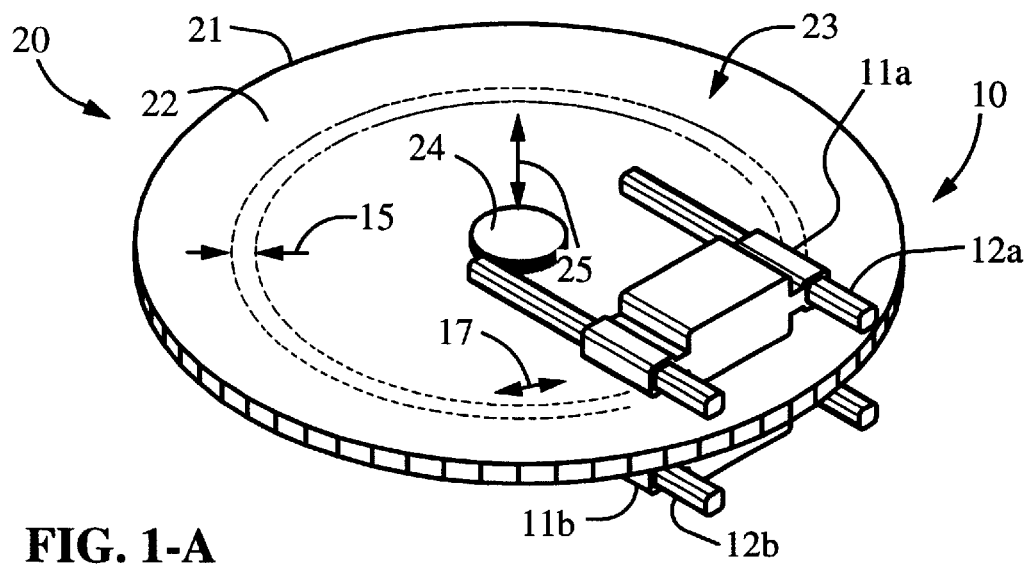
FIG. 1-A
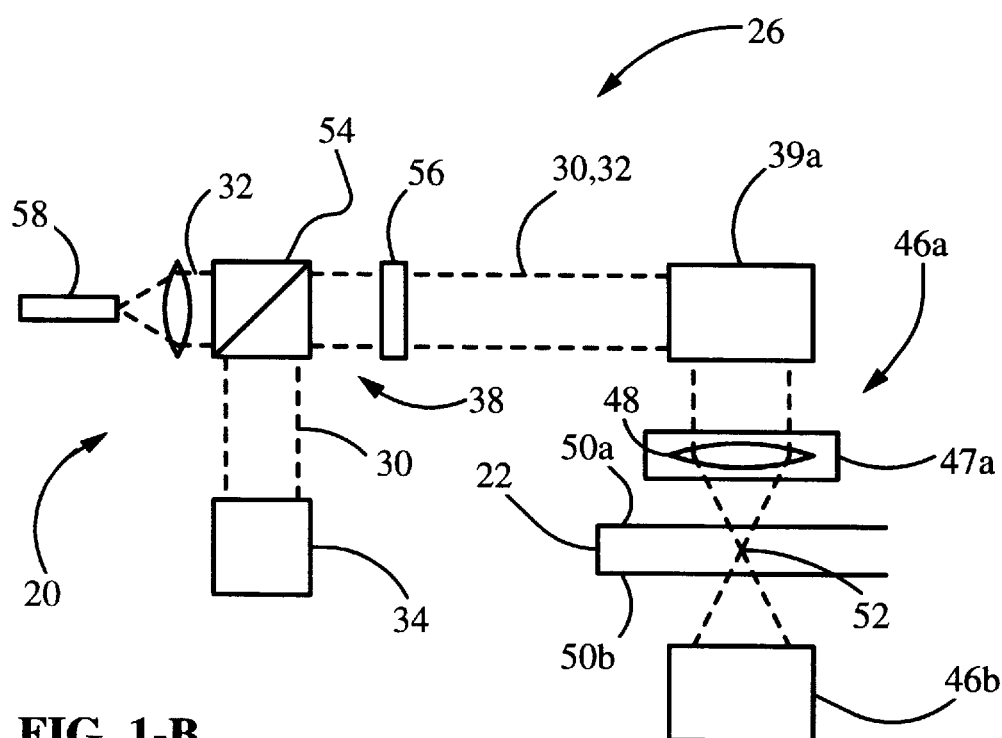
FIG. 1-B

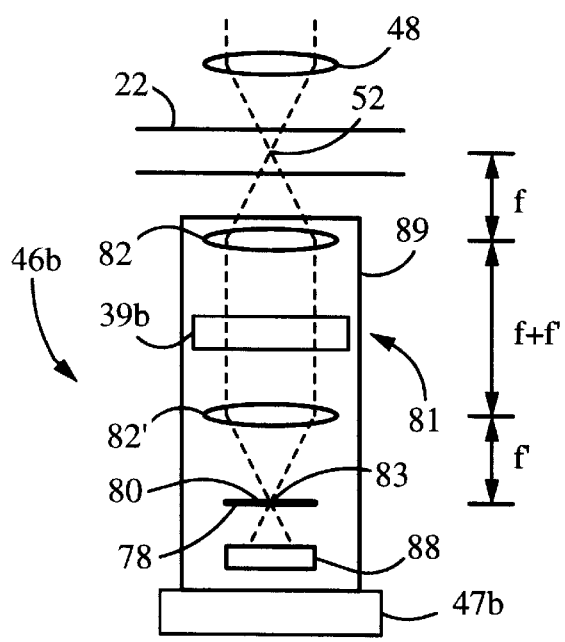
FIG. 2
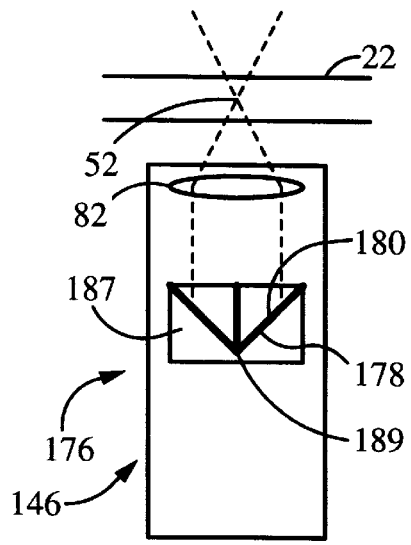
FIG. 3-A
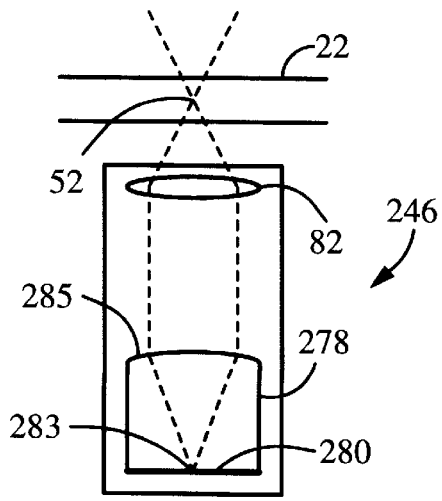
FIG. 3-B
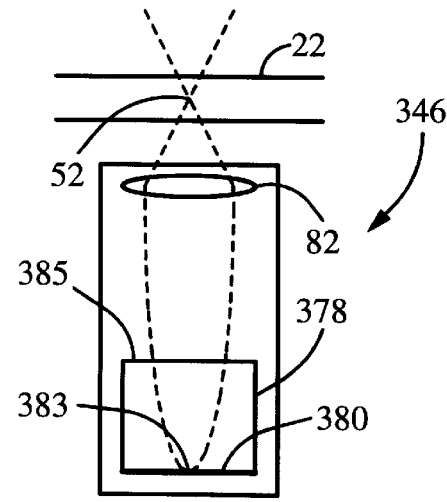
FIG. 3-C

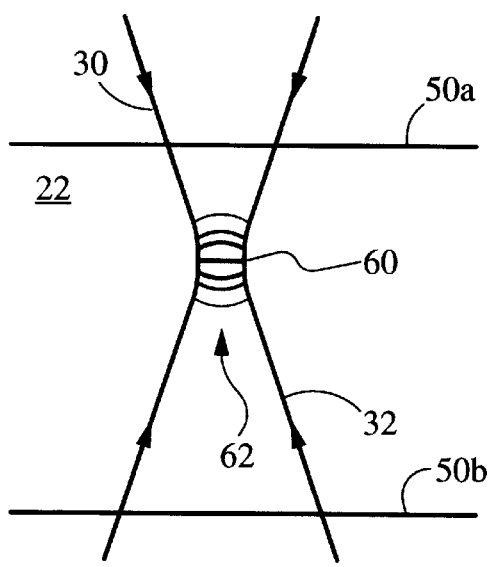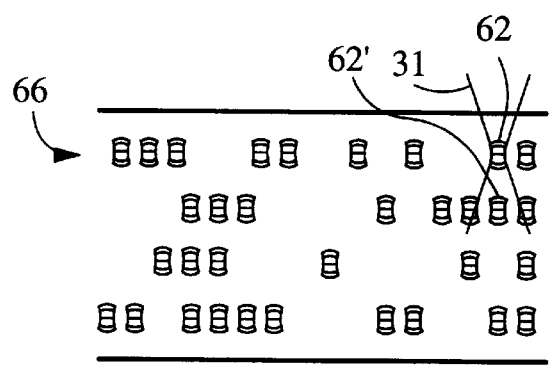
FIG. 4-A　　　　　　　　　FIG. 4-B

POSITIVE UNIT MAGNIFICATION REFLECTIVE OPTICS FOR HOLOGRAPHIC STORAGE

RELATED APPLICATION DATA

This application is a continuation of U.S. patent application Ser. No. 09/071,478, filed May 1, 1998, issued under U.S. Pat. No. 6,147,782, which is herein incorporated by reference.

BACKGROUND

The present invention relates to bit-wise holographic data storage systems and methods, and in particular to reflective optics for bit-wise holographic storage systems.

In holographic storage, data are stored in holograms resulting from the interference of a signal and reference beam. During storage, both the reference and signal beams are incident on the storage medium. During retrieval, only the reference beam is incident on the medium. The reference beam interacts with a stored hologram, generating a reconstructed signal beam proportional to the original signal beam used to store the hologram. Relative to conventional magnetic and optical data storage methods, holographic data storage promises high storage densities, short access times, and fast data transfer rates. Conventional page-based volume storage, however, typically requires specialized components such as spatial light modulators and charge-coupled detectors.

The storage of localized holograms (bit-wise storage) may allow the use of simpler optical components than page-base holographic storage. Localized-hologram storage systems may be sensitive to tilts and misalignments of the optical components used to direct the signal and reference beams to the storage medium.

SUMMARY

Briefly, and in general terms, the present invention provides a localized-hologram digital data storage system and method having a relatively high tolerance for tilts and lateral misalignments between a primary head and a corresponding reflective head. Such tolerance becomes increasingly important with increased numerical apertures (N.A.), as the size of the holograms is decreased.

The present invention provides a holographic digital data storage system comprising a holographic storage medium, a light source comprising a laser for generating a primary storage light beam incident on the medium, a primary head in optical communication with the laser and facing the medium, for focusing the primary beam at storage locations within the medium, and a reflective head comprising positive unit magnification reflective optics positioned facing the medium opposite the storage head. The reflective optics reflect the primary beam to generate a reflected storage beam substantially counterpropagating with respect to the primary beam at the accessed storage locations. The primary and reflected beams are coincidentally focused at the accessed storage locations. The interference of the primary and reflected beams causes storage of localized reflection holograms at the accessed storage locations.

In one embodiment, the reflective optics comprise a flat mirror and imaging optics appropriately positioned between the mirror and the medium. The imaging optics image an accessed storage location onto a spot on the mirror. In another embodiment, the reflective optics comprise a corner cube reflector. The use of positive unit magnification reflective optics provides for a relative tolerance of the system to tilts and lateral misalignments of the reflective optics relative to the primary optics.

Other features and advantages of the invention will become apparent from the following detailed description, taken in conjunction with the accompanying drawings, which illustrates by way of example the invention.

DESCRIPTION OF THE FIGURES

FIG. 1-A shows a perspective view of a preferred holographic storage system of the present invention.

FIG. 1-B shows a schematic side view of the optical components of the system of FIG. 1-A.

FIG. 2 depicts a schematic side view of a preferred reflective head of the present invention.

FIG. 3-A shows a schematic side view of an alternative reflective head of the present invention.

FIG. 3-B illustrates a schematic side view of another alternative reflective head of the present invention.

FIG. 3-C shows a schematic side view of yet another alternative reflective head of the present invention.

FIG. 4-A shows an enlarged schematic side view of a reflection microhologram stored at the focus of counter-propagating beams incident from opposite sides of a storage medium, according to the preferred embodiment of the present invention.

FIG. 4-B is an enlarged cross-sectional view of a storage medium illustrating a typical arrangement of multiple microhologram layers in the preferred embodiment of the present invention.

DETAILED DESCRIPTION

In the following discussion, unless otherwise stated, all distances are understood to be optical pathlengths rather than physical pathlengths. The optical distance between two elements may be related to the physical distance between the elements by taking into account the effects of any refractive optics positioned between the elements.

FIG. 1-A shows a perspective view of a presently preferred reflection microhologram storage system 20 of the present invention. A disk-shaped storage device 21 comprises a holographic storage medium 22, as well as packaging elements for mechanically protecting medium 22 and for mounting device 21 onto holder 24. The packaging elements are conventional and will not be described. Device 21 is detachably mounted on a rotary holder 24. Holder 24 is controlled by a spindle mechanism to continuously rotate medium 22 at high angular velocity about an axis of rotation 25. The direction of axis of rotation 25 lies along the depth direction of medium 22.

Medium 22 is preferably formed of a structurally homogeneous planar layer of a photopolymer having a thickness on the order of hundreds of $\mu$m, for example about 1 mm or less. For information on photopolymers see for example Lessard and Manivannan (ed.), *Selected Papers on Photopolymers*, SPIE Milestone Series, v. MS-114, SPIE Optical Engineering Press, Bellingham, Wash. 1995. Multiple layers (preferably >5) of concentric data tracks 23 are stacked along the depth of medium 22. Adjacent data tracks at one depth are separated along a radial direction 15, while holograms along a data track are separated along a circumferential direction 17.

A head/arm assembly 10 is used to access storage locations within medium 22. Head/arm assembly 10 and holder 24 are connected to a fixed housing (not shown). Head/arm assembly 10 comprises carriage assemblies 11a–b, which are movably mounted on fixed, generally radial, mutually parallel rails 12a–b, respectively. Carriage assemblies 11a–b are capable of linear motion along rails 12a–b along a generally radial direction relative to medium 22. Carriage assemblies 11a–b each comprise actuators for controlling their coarse tracking positionings along rails 12a–b, with respect to medium 22. Carriage assemblies 11a–b face opposite (top and bottom) sides of medium 22.

FIG. 1-B shows a schematic side view of the optical components of system 20. Optics 26 for generating a primary storage beam 30 and a reflected storage beam 32 are mechanically coupled to holder 24. Optics 26 are positioned such that beams 30, 32 coincidentally access a given storage location 52 within medium 22 in a counterpropagating geometry when medium 22 is mounted on holder 24. Optics 26 comprise a number of components in mutual optical communication: a laser 34, a tunable-focus primary storage head 46a, and a tunable-focus reflective storage head 46b. Heads 46a–b are situated on opposite sides of medium 22, facing opposite planar input surfaces 50a–b of medium 22, respectively. Laser 34 generates primary beam 30. Primary head 46a directs and focuses beam 30 onto storage location 52. Reflective head 46b generates reflected beam 32 by reflecting beam 30, and directs and focuses reflected beam 32 onto storage location 52. Laser 34 and head 46b are chosen/designed such that beams 30, 32 are mutually coherent at location 52. In particular, the coherence length of laser 34 is chosen to be large enough to allow the storage of a hologram at location 52.

Primary head 46a comprises a high numerical aperture (N.A.) objective lens 48 positioned facing medium 22. Objective lens 48 typically has a N.A. higher than 0.25, preferably higher than about 0.4, and more preferably about 0.5. High numerical apertures are desirable since they allow relatively short depths of field, and consequently relatively close interhologram spacings along the depth of the medium. High numerical apertures also allow relatively small spot sizes for stored holograms, potentially allowing relatively high system capacity. Increasing numerical apertures above about 0.6 or 0.65 may lead to substantially increased complexity in the optics required for storage and retrieval, and to more stringent tolerances on mechanical components.

Lens 48 is mounted on a focusing actuator 47a. Actuator 47a dynamically controls the vertical (in-depth) motion of lens 48 relative to medium 22, thus controlling the focusing of lens 48 relative to medium 22. Focusing is performed both coarsely for accessing different depth layers within medium 22, and finely for maintaining lens 48 focused on a desired depth layer.

A dynamic aberration compensator 39a is positioned in the light path between laser 34 and medium 22. Compensator 39a dynamically compensates for the variable spherical aberration introduced in primary beam 30 by medium 22. The spherical aberration introduced in beam 30 depends on the depth accessed by beam 30 at location 52. Aberration compensators are generally well known. Various dynamic aberration compensators have been described for conventional pit-based storage, for example in U.S. Pat. No. 5,202,875 (Rosen et al), herein incorporated by reference. While aberration compensator 39a is shown for clarity as separate from objective lens 48 and actuator 47a, aberration compensator 39a may be integrated with lens 48.

System 20 further includes beam separation components 38 situated between laser 34 and objective lens 48, in the optical path of beams 30, 32. Beam separation components 38 preferably comprise a polarizing beam splitter (PBS) 54 and a quarter-wave plate 56. Components 38 direct primary beam 30 from laser 34 to objective lens 48, while directing reflected beam 32 to an axial alignment monitoring detector 58. Detector 58 is positioned to receive light extending from components 38. Detector 58 comprises spatial filtering optics for allowing selective access to storage locations at a desired depth within medium 22. The spatial filtering optics admit primarily reflected light 32 originating from the focus of primary light 30. The spatial filtering optics preferably include an appropriately placed pinhole for selectively allowing only rays extending from an accessed storage location to be directed to detector 58. The pinhole blocks stray light from non-accessed regions of medium 22.

FIG. 2 shows a schematic side view of head 46b. Head 46b comprises a mirror 78 defining a planar reflective surface 80, and imaging optics 81 positioned in an optical path between primary head 46a and reflective surface 80. Optics 81 image the focus of primary beam 30 onto a spot 83 on surface 80, and similarly image spot 83 at the focus of reflected beam 32 at location 52. Optics 81 include first and second lenses 82, 82' positioned between medium 22 and surface 80. Lenses 82, 82' are preferably high-N.A. lenses similar to lens 48. Lenses 82, 82' and mirror 78 are rigidly attached in a fixed configuration to a housing 89. Housing 89 is mounted on a three-axis actuating system 47b, for controlling the position of head 46b relative to head 46a.

Actuator 47b comprises a focusing component for controlling the axial positioning of head 46b, a radial positioning component for controlling the radial positioning of head 46b, and a timing component for controlling the position of head 46b relative to head 46a along a track. The focusing component is in electrical communication with detector 58 through axial positioning electronics (not shown). During storage, detector 58 dynamically monitors the axial (depth) alignment of heads 46a–b, and sends output signals indicative of the axial alignment to the axial positioning electronics. In response to electrical signals received from the axial positioning electronics, the focusing component moves housing 89 axially relative to medium 22 to ensure that beams 30, 32 are coincidentally focused at storage location 52.

Preferably, reflective surface 80 is partially reflective and partially transmissive, allowing a small light intensity to leak through to a lateral positioning monitoring detector 88 positioned below surface 80, opposite medium 22. Detector 88 is preferably a quadrant detector. Detector 88 is connected through lateral positioning electronics (not shown) to the radial and timing components of actuator 47b. In response to electrical signals received from the lateral positioning electronics, the radial and timing components move housing 89 relative to medium 22 to ensure that heads 46a–b are coarsely laterally aligned. [because this is a +1 arrangement, fine lateral alignment is not needed]

A dynamic aberration compensator 39b is positioned in the light path between mirror 78 and medium 22. Compensator 39b dynamically compensates for the variable spherical aberration introduced in reflected beam 32 by medium 22.

The focal lengths of lenses 82, 82' are f and f', respectively. Preferably, f' is relatively large (e.g. f'>f), in order to increase the spot size on surface 80 and reduce the potential optical damage to surface 80. If optical damage to surface 80 is not an important consideration, setting f' equal to f may be advantageous for minimizing the axial size of head 46b.

First lens 82 is positioned a distance f from storage location 52. Second lens 82' is positioned in an optical path between first lens 82 and surface 80, a distance f' from surface 80 and a distance f+f' from first lens 82.

Lenses 82, 82' and surface 80 form a paraxially symmetric optical system with +1 symmetry. In the paraxial approximation, the ray matrix relating the plane of reflective surface 80 to the plane of the focus of primary beam 30 is $$M_1 = \begin{pmatrix} -\dfrac{f'}{f} & 0 \\ 0 & -\dfrac{f}{f'} \end{pmatrix}. \quad [1]$$

Ray matrix $M_1$ relates spot 83 to the focus of primary beam 30. Similarly, the ray matrix relating the plane of the focus of reflected beam 32 at location 52 to the plane of reflective surface 80 is $$M_2 = \begin{pmatrix} -\dfrac{f}{f'} & 0 \\ 0 & -\dfrac{f'}{f} \end{pmatrix}. \quad [2]$$

Ray matrix $M_2$ relates the focus of reflected beam 32 at location 52 to spot 83. The total ray matrix characterizing the imaging performed by head 46b is $$M = M_2 M_1 = \begin{pmatrix} 1 & 0 \\ 0 & 1 \end{pmatrix}. \quad [3]$$

Thus, head 46b images the focus of primary beam 30 onto itself at +1 magnification. Equation [3] indicates that, in the paraxial approximation, small changes in the lateral position of head 46b relative to the focus of primary beam 30 do not affect the coincidence of the foci of beams 30, 32. By contrast, lateral displacements in a negative magnification imaging system (e.g. a concave mirror) would result in corresponding displacements between the foci of the incident and reflected beams.

Referring to FIGS. 1-B and 2, laser 34 generates monochromatic linearly-polarized primary light 30. PBS 54 directs primary light 30 toward medium 22, and quarter-wave-plate 56 changes its polarization state to circular. Aberration compensator 39a introduces a controlled degree of spherical aberration into primary light 30, chosen so as to compensate for the spherical aberration introduced into primary light 30 by medium 22. Primary light 30 is focused at storage location 52, passes through medium 22, and is reflected by reflective surface 80 to generate reflected light 32. Aberration compensator 39b compensates for the spherical aberration introduced into reflected light 32 by medium 22. Reflected light 32 has a circular polarization of opposite handedness to that of primary light 30 at storage location 52. Reflected light 32 is focused at storage location 52, where it interferes with primary light 30 to cause storage of a localized hologram. The polarization of reflected light 32 is changed to linear by QWP 56, such that reflected light 32 is transmitted by PBS 54 to detector 58.

A system similar to system 20 can be used for retrieval. Reflective head 46b is then replaced by a beam stop, and detector 58 is used for reading out stored holograms. During retrieval, accessing a storage location with primary beam 30 generates a reflected, reconstructed output signal beam whose amplitude is indicative of whether a hologram is stored at the accessed storage location. If the accessed location does not contain a stored hologram, it does not generate a reconstructed output beam. Beam separation components 38 function essentially as described above, as the stored holograms reverse the handedness of circularly polarized light upon reflection.

Alternative Reflective Optics

FIG. 3-A shows a reflective head 146 according to an alternative embodiment of the present invention. Head 146 comprises a corner cube reflector 176. Due to the relative delocalized nature of incident light, reflector 176 is relatively insensitive to optical damage. Reflector 176 has a solid transparent corner-cube reflective part 178 defining a corner-cube reflective surface 180. The aperture of reflective part 178 is preferably circular, but can also be triangular or hexagonal. Reflector 176 further includes a transparent plastic filler 187 bonded to reflective surface 180, opposite medium 22 relative to surface 180. Filler 187 is used to control the index of refraction next adjacent to reflective surface 180 such that primary beam 30 is incident on surface 180 at the critical angle, as explained below.

Lens 82 is positioned in the optical path between medium 22 and reflector 176. Lens 182 is positioned a distance f from location 52 and from the apex 189 of reflector 176. The physical distance between lens 82 and apex 189 can be related to the optical distance f by taking into account the refractive effect of the solid material of part 178, as is apparent to the skilled artisan.

If plane-polarized light is incident on reflective surface 180, in general the reflected light may have a complex distribution of six polarizations, with the polarizations depending on the propagation direction of the light. For plane-polarized light incident at the critical angle, the reflected light will be uniformly plane-polarized. For a corner cube, the angle of incidence of light on a reflector surface is given by the condition $$\cos\theta_{inc} = 1/\sqrt{3}. \quad [4]$$

At the same time, the critical angle is given by the condition $$\sin\theta_{crit} = n_{ext}/n_{int}, \quad [5]$$

where $n_{ext}$ and $n_{int}$ are the indexes of refraction above and below reflective surface 180. Setting the condition that $\theta_{inc} = \theta_{crit}$ gives $$n_{ext}/n_{int} = \sin(\text{Arc}\cos(1/\sqrt{3}) = 0.816497 \quad [6]$$

Equation [6] can be termed the critical angle condition for reflector 176. If the indexes of refraction $n_{ext}$ and $n_{int}$ are independent of polarization direction, the critical angle condition [6] ensures that incident circularly-polarized light results in reflected circularly-polarized light of the opposite handedness.

Equation [6] can be used to determine suitable materials for plastic filler 187 and reflective part 178. In one implementation, LASF14A glass (n=1.8295) is used for reflective part 178, and Lucite® moldable plastic (n=1.493) is used for filler 187.

FIG. 3-B shows a reflective head 246 according to another alternative embodiment of the present invention. Head 246 includes a reflective glass block 278 having a planar reflective back surface 280 and a convex front surface 285. Front surface 285 serves as a lens of focal length f' outside its front (in air), and focal length f" within block 278 (in glass). Front surface 285 is separated by a distance f" from reflective surface 280, and by a distance f+f' from lens 82.

FIG. 3-C illustrates a reflective head 346 according to yet another alternative embodiment of the present invention. Head 346 comprises a gradient-index (GRIN) lens/reflector 378. The index of refraction within lens 378 varies linearly along its radius (perpendicular to the optical axis). Lens 378 has a planar reflective back surface 380 and a front input surface 385. Light rays follow a parabolic trajectory within lens 378. Lens 378 images storage location 52 to a spot 383 on back surface 380.

Reflection Microholograms

Alignment requirements for the primary and reflective heads become increasingly important as the size of the stored holograms is decreased. The relaxation in alignment requirements allowed by a unit magnification reflective unit of the present invention is particularly useful for the storage of reflection microholograms, as described in the above-referenced U.S. patent application Ser. No. 09/016,213.

FIG. 4-A illustrates a preferred reflection microhologram 62 stored at the coinciding foci of beams 30, 32. Microhologram 62 has substantially planar fringes at focus 60, parallel to the depth direction of medium 22. The grating frequency of microhologram 62 is approximately twice the frequency of beams 30, 32 within medium 22. The fringes of microhologram 62 are parallel only along a small fraction of the total depth of medium 22. Away from focus 60, the fringes of microhologram 62 are increasingly curved and weaker. Perfect Bragg-matching a readout beam to microhologram 62 requires accessing microhologram 62 with a light beam identical to primary beam 30 or reflected beam 32. Small deviations from perfect Bragg-matching continue to allow readout of microhologram 62 if the accessing beam is sufficiently Bragg-matched to microhologram 62. The lack of efficient signal reconstruction in the absence of Bragg-matching allows the storage of microholograms at multiple depths.

Since its fringes are substantially parallel to the direction of motion of medium 22, microhologram 62 can be stored and/or retrieved while medium 22 is rotating. For a numerical aperture of about 0.5 and wavelength of about 500 nm, microhologram 62 has on the order of tens of fringes within the Rayleigh range of a corresponding Bragg-matched reference beam. Microhologram 62 is thus relatively tolerant to shrinkage within medium 22, wavelength shifts of laser 34, and phase drifts in laser 34, as compared to microholograms containing a larger number of fringes.

Microhologram 62 is preferably stored at the diffraction limit of high-N.A. optics. Microhologram 62 extends over a depth of less than a few tens of microns (e.g. <30 $\mu$m), preferably about 10 $\mu$m. The depth of microhologram 62 is preferably defined by the Rayleigh range of beams 30a–b. Microhologram 62 has a spot (in plane) size of less than a few microns (e.g. <3 $\mu$m), preferably about 1 $\mu$m in diameter. A microhologram length of 1 $\mu$m corresponds to a readout time of tens of ns for a medium speed of tens of m/s. The spot size may limit the minimal intertrack spacing, as well as the data density along a track. Adjacent tracks are preferably spaced by a distance at least on the order of the microhologram spot size, preferably at least about 1 $\mu$m. Adjacent microholograms along a track are also separated by a distance at least on the order of the microhologram spot size. As indicated, a reflection microhologram occupies a relatively small volume.

FIG. 4-B shows a side sectional view through medium 22, illustrating a typical relative arrangement of microholograms in depth. Multiple planar layers 66 of microholograms are stacked along the depth of medium 22. Adjacent layers are separated by a distance on the order of the hologram depth or depth of focus of the accessing beams, preferably about 10 $\mu$m center-to-center. The interlayer spacing may vary in depth.

For simplicity, the combined primary and reflected beams used to store reflection microholograms 62, 62' are denoted as light beam 31. Holograms 62, 62' are situated in different (e.g. adjacent) layers. When light beam 31 is focused at the location of hologram 62, the out-of-focus parts of light beam 31 also illuminate the storage location of hologram 62'. The out-of-focus light used for accessing the location of hologram 62, even though of a relatively low intensity, can reduce the dynamic range of index changes and diffraction efficiencies achievable at the storage location of hologram 62'.

The degradation of optical properties at one location due to data storage at other locations within medium 22 can be characterized by the "scheduling loss" of the system. Scheduling losses can limit the number of microhologram layers that may be stacked. In an optically linear material, the maximum index change at a location varies inversely with the cumulative intensity of light that has contaminated that location. The diffraction efficiency generally varies as the square of the maximum index change. If N layers are written using identical light intensities, the maximum index change in each layer varies as 1/N, while the diffraction efficiency of stored data varies as $1/N^2$. Scheduling losses can be reduced through the use of an optically non-linear storage material.

It will be clear to one skilled in the art that the above embodiments may be altered in many ways without departing from the scope of the invention. For example, the reflective unit may include a phase-conjugate elements such as a holographic optical element (HOE). The storage medium need not be disk-shaped. Data may be stored in a Cartesian geometry, with the heads controlled by x-y stages. The storage medium may be moved relative to vertically-fixed heads to bring different depths in focus. A non-linear medium such as a two-photon medium can be used, in which light incident on the medium at one wavelength sensitizes the medium for recording at another wavelength. The use of a non-linear storage material may reduce scheduling losses that occur in linear media. Electronics for relatively positioning the primary and reflective heads are not necessarily needed. Alignment of the heads may be achieved by mounting the heads on a rigid yoke providing a stable mechanical lateral connection between the heads. In such an arrangement, fine axial positioning of one of the heads with respect to the other may still be performed.

It will be apparent from the foregoing that, while particular forms of the invention have been illustrated and described, various modifications can be made without departing from the spirit and scope of the invention. Accordingly, it is not intended that the invention be limited, except as determined by the following claims and their legal equivalents.

What is claimed is:

1. A holographic data storage method comprising:
    a) generating a primary beam incident on an accessed storage location in a holographic storage medium; and
    b) generating an image of said accessed storage location at positive unit magnification, wherein said image coincides with said accessed storage location for storing a reflection microhologram at said accessed storage location.

2. The method of claim 1 further comprising storing a plurality of reflection microholograms at a plurality of depths within said medium.

3. A holographic data storage method comprising:

a) generating a primary beam incident on an accessed storage location in a holographic storage medium; and b) generating an image of said accessed storage location at positive unit magnification using reflective optics spaced apart from said storage medium, wherein said image coincides with said accessed storage location, for storing a reflection microhologram at said accessed storage location.

4. The method of claim 3 further comprising storing a plurality of reflection microholograms at a plurality of depths within said medium.

* * * * *